May 8, 1951     W. FUNK     2,551,936
THREADING MACHINE HAVING ELECTRICAL AND
MECHANICAL REVERSING CONTROLS

Filed Jan. 2, 1947     3 Sheets-Sheet 1

INVENTOR.
WILLIAM FUNK.
BY
Joseph B. Gardner
ATTORNEY

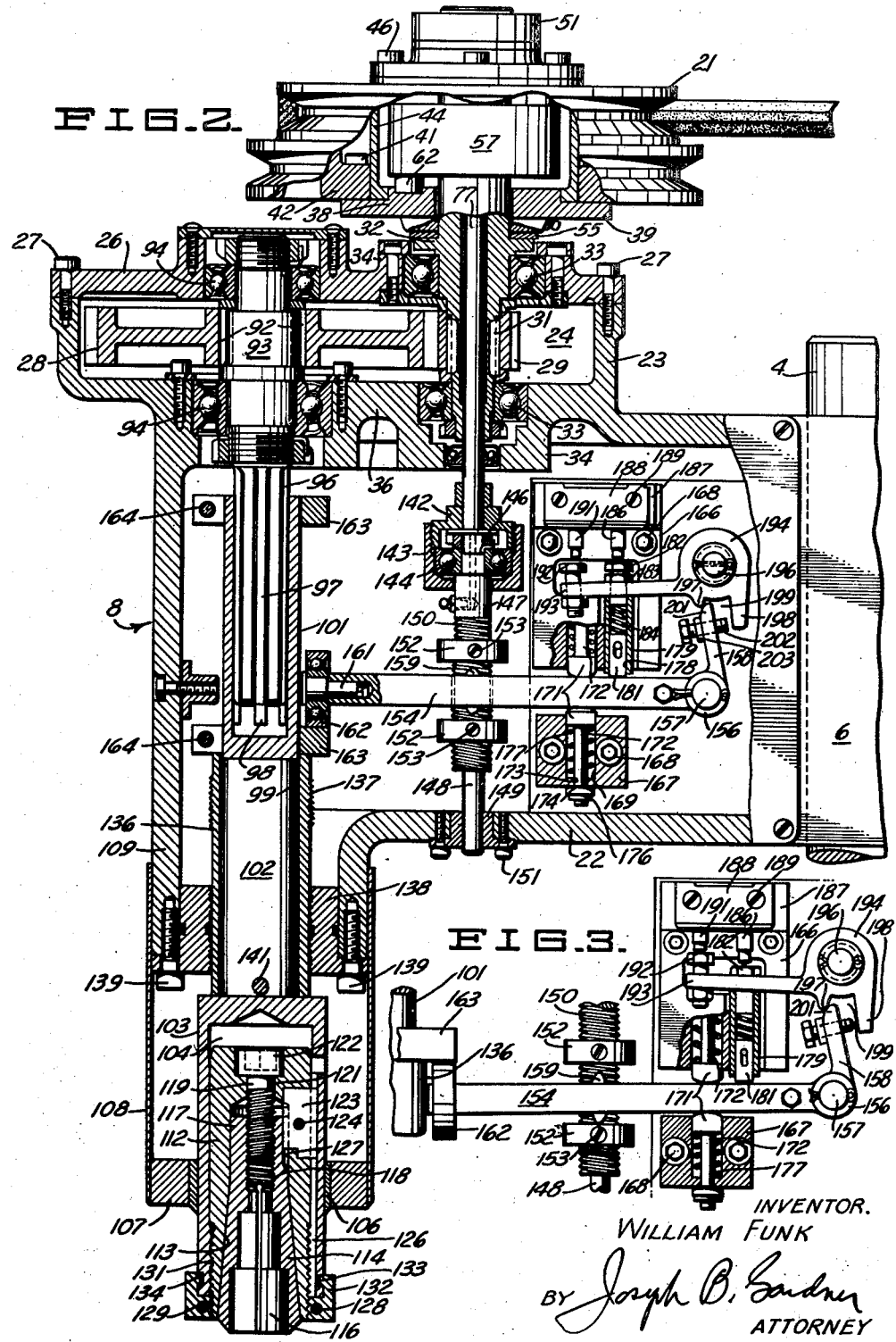

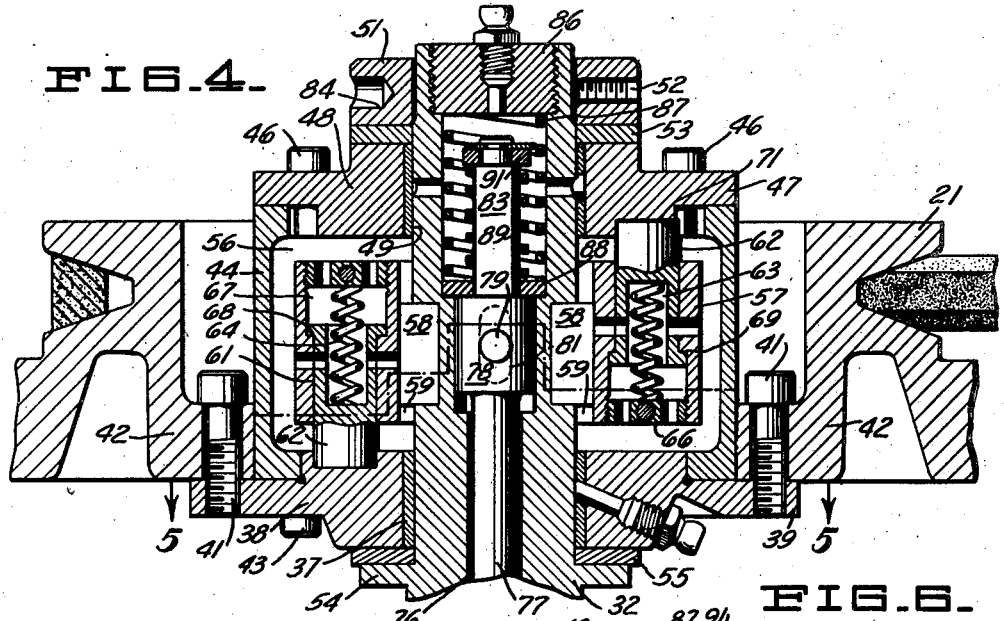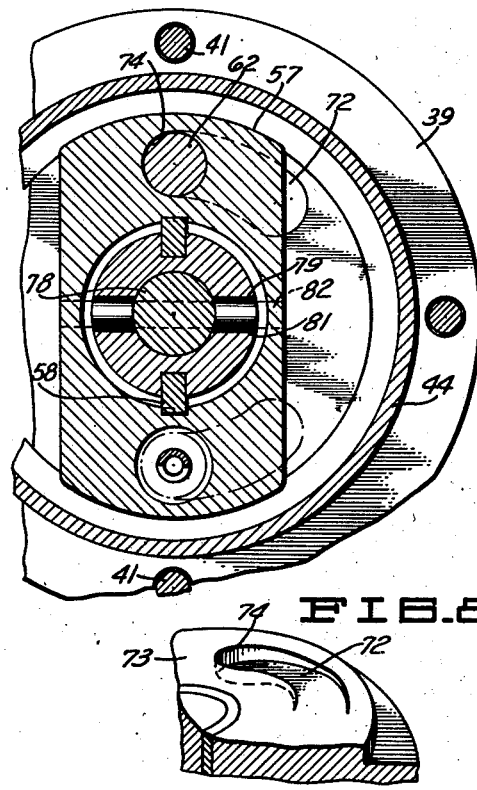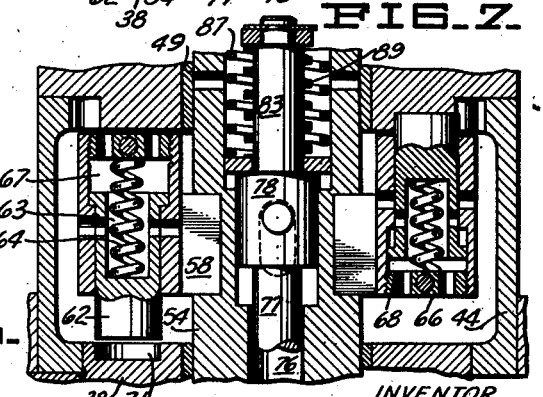

Patented May 8, 1951

2,551,936

UNITED STATES PATENT OFFICE 2,551,936

THREADING MACHINE HAVING ELECTRICAL AND MECHANICAL REVERSING CONTROLS

William Funk, Stockton, Calif., assignor to Rheem Manufacturing Company, Richmond, Calif., a corporation of California Application January 2, 1947, Serial No. 719,902

7 Claims. (Cl. 10—136)

This invention relates to power devices for driving cutting tools in the nature of drills and reamers and has particular reference to such a device adapted to cut screw threads.

An object of the invention is to provide threading mechanism, for use in the continuous production of large numbers of threaded parts, in which a tap or die may be advanced independently of the natural feed provided by the helical arrangement of the thread-cutting teeth and in exact accordance with the pitch of the thread to be cut so that more perfect threads are produced and wear and rapid dulling of the tap or die due to side drag are greatly reduced.

Another object of the invention is to provide power-driven threading mechanism including comparatively sensitive controls for governing the degree of advancement of the threading tool so that threads extending entirely up to a shoulder or to the bottom of a recess may be safely made without the danger of die or tap breakage.

A further object of the invention is to provide mechanism of the character described which is designed for operation at comparatively high speed so as to be useful in fast production line operations.

The invention posses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 2 is a vertical sectional view of the threading mechanism to an enlarged scale.

Figure 3 is a vertical sectional view, similar to an equivalent portion of Figure 2, showing the switch actuating mechanism in one operative position thereof.

Figure 4 is an enlarged vertical sectional view of the power input shaft pulley and clutch mechanism.

Figure 5 is a portional horizontal sectional view taken in the line indicated by the line 5—5 of Figure 4.

Figure 6 is a view of a portion of the structure of Figure 4 showing the shiftable clutch member in one operative position thereof.

Figure 7 is a view similar to Figure 6 showing the clutch member in another operative position thereof.

Figure 8 is a portional perspective view of one of the clutch ratchet recesses.

Figure 1:
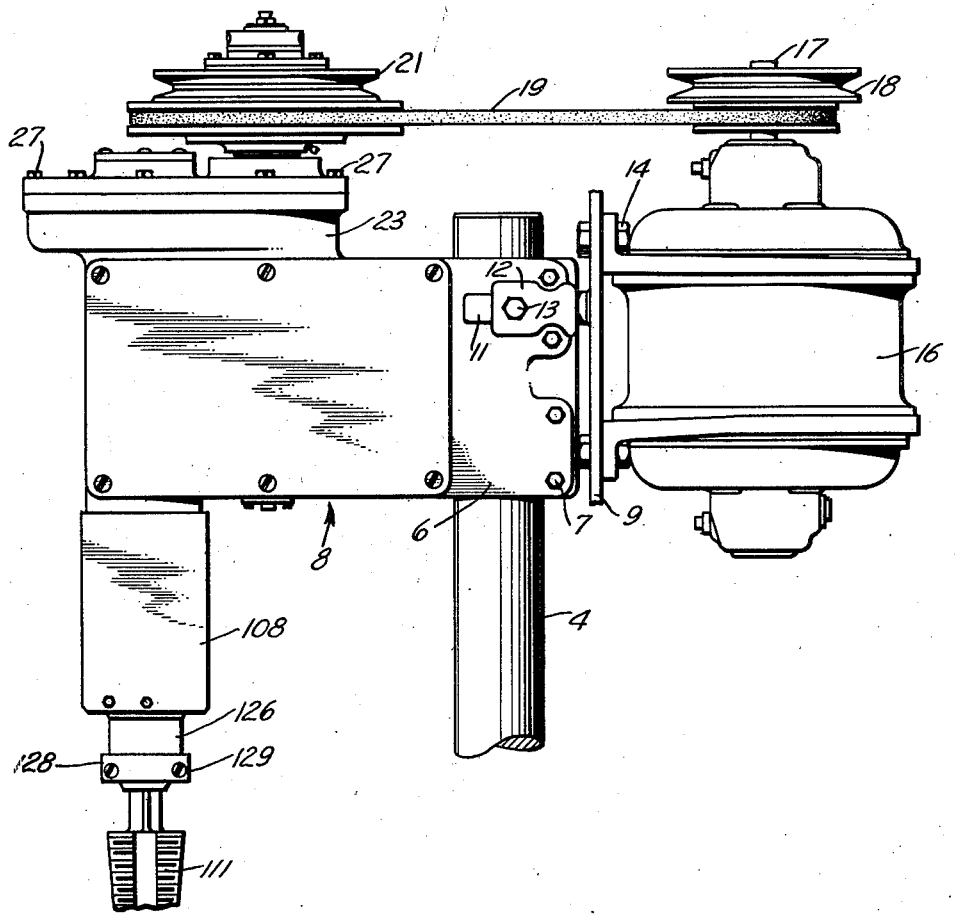
Figure 1 is a side elevational view of the threading mechanism of my invention showing its relation with a drive motor and supporting structure, the latter element being broken away.

In the form of my invention shown in the drawings, and with reference to Figure 1, I provide for mounting on a standard drill press column, or other axially vertical cylindrical support 4, a slide member 6 suitably bored to receive the column and provided with bolts 7 or equivalent devices by means of which the slide member may be clamped in a vertical position of adjustment relative to the column. Formed integrally with and extending radially from the slide member is the tool drive mechanism, generally indicated by the numeral 8, which will be described in particular detail presently and provided at a diametrically opposite position relative to the latter mechanism is a carrier 9 having studs 11 thereon slidably engaging bosses 12 formed in the slide member and securable by means of clamp screws 13 or the like. Mounted by bolts 14 on the carrier 9 is a reversible drive motor 16 having an axially vertical shaft 17 carrying a stepped cone pulley 18 engaging a belt 19 which also tractionally engages a stepped cone pulley 21 associated with and forming the power input element of the tool drive mechanism 8. The sliding stud mounting of the carrier 9 may be utilized, it will be seen, as belt tightening means or as a means for adjusting the spacing between the axes of the pulleys 18 and 21 when the belt 19 is selectively engaged with different pairs of cooperative peripheral grooves of the pulleys.

Referring now to Figure 2 it will be seen that the tool drive mechanism 8 comprises a hollow housing 22 having at its upper end an integral extension housing 23 containing a chamber 24 closed by a cover plate 26 secured by screws 27 to the housing 23 and enclosing a spindle drive gear 28 and an associated pinion 29 meshing therewith. The pinion 29 is secured, by keys 31, to a tubular power input shaft 32 extending vertically through the chamber 24 and journaled in bearings 33 mounted in axially aligned bosses 34 provided in the bottom wall 36 of the chamber 24 and in the cover plate 26. Contained preferably within the pulley 21 and providing a releasable drive connection between the latter and the power input shaft 32 is a suitable clutch mechanism which may be selectively conditioned in each direction of rotation of the pulley to apply driving torque to the shaft corresponding to the direction of rotation of the pulley or to run free of the shaft in the aforesaid direction of pulley rotation while retaining torque-transmitting relationship with the shaft in the associated reverse direction of rotation of the pulley. Such clutch mechanism may take one of several forms but I prefer to employ the specific structure shown in Figures 4 to 7 inclusive in which the power input shaft 32 is extended upwardly through and journaled in the central bearing 37 of a lower clutch plate 38 having a peripheral flange 39 with which are threadedly engaged screws 41 extending through suitable apertures formed in an internal flange 42 formed in the pulley 21 and securing the latter to and for rotation with the clutch plate 38. Also secured by screws 43 to and rising from the flange 39 in concentric relation with the shaft 32 is a cylindrical clutch housing 44 to the upper end of which is secured, by screws 46, the peripheral flange 47 of an upper clutch plate 48 having a bushed central aperture 49 in which the upper end portion of the shaft 32 is journaled. A collar 51 threadedly engaging the upper extremity of the shaft 32 and secured against displacement by a setscrew 52 or other equivalent locking device, bears against a thrust washer 53 overlying the upper clutch plate so as to confine the shaft 32 against axial movement in one direction, and a collar 54 formed integrally with the shaft and bearing against a similar thrust washer 55 underlying the lower clutch plate 38 restrains the shaft from axial movement in the other direction. It will be seen from the description thus far that the pulley 21, the upper and lower clutch plates 48 and 38 and the clutch housing 44 are all connected together and may rotate as an integral unit about the axis of the shaft 32.

Within the chamber 56 of the clutch housing 44, I provide a clutch block 57 slidable axially of the shaft 32 and disposed in concentric relationship therewith. Keys 58 retained in suitable keyseats provided at diametrically opposed portions of the shaft 32, slidably engage keyways 59 vertically arranged in the clutch block so that the latter and the shaft are connected together to be rotated in unison but at the same time permitting the aforesaid axial movement of the clutch block relative to the shaft. At diametrically opposed positions in the clutch block, I provide axially vertical bores 61 in each of which is mounted for vertical slidable movement a stud-shaped clutch pawl 62 having a recess 63 bored axially thereof in which is received one end of a coil spring 64, the other end of which bears against a plug member 66 threadedly engaged and secured in a counterbore 67 forming an axial extension of the pawl guide bore 61. The springs 64 are installed in axial compression so that, in expanding, they will urge the pawls toward extended positions relative to and vertically outwardly of the clutch block; and an integral collar 68 formed at an end of each pawl is disposed slidably in the counterbore 67 to engage the shoulder 69 defining the junction between the counterbore and the pawl guide bore 61 so as to provide a positive stop limiting the degree of outward extension of the pawls. It will be noted that the pawls 62 are arranged to project oppositely from the clutch block toward the upper and lower clutch plates 48 and 38 respectively. In the face of each clutch plate confronting the clutch block and its projecting pawls I provide a ratchet recess 71 registering with and curved arcuately to conform with the orbital path of movement of the pawls about the vertical axis of the shaft 32 and arranged to be engaged by the projecting end portion of a cooperative pawl. Each recess 71, as shown by the illustration of Figure 8, is provided with a bottom surface 72, substantially angularly inclined with respect to the adjacent face 73 of the clutch plate, and with a vertical end abutment 74 against which the side of the pawl 62 may strike. The recess 71, at the end thereof opposite the abutment 74, rises toward and merges into coplanar relationship with the face 73 of the clutch plate. Thus the pawl upon entering the recess from the open end thereof will bear against the surface 72 which will allow the pawl to descend until the pawl engages and comes to rest against the abutment 74. Conversely when the pawl is moved from the aforesaid position of rest, it will pass upwardly along the surface 72 to pass out of the recess and onto the face 73 of the clutch plate. It will be seen in Figure 5 that the recess 71 of the lower clutch plate, shown by the full lines, extends from its abutment 74 in a clockwise direction and the recess of the upper clutch plate, indicated by the dot and dash lines, extends when viewed in the same direction from its abutment 74 in a counter-clockwise direction. When the clutch block 57 is in its mid-position while passing between its upper and lower limits of travel, both pawls 62, as shown in Figure 4, will be engaged with their respective recesses so that regardless of which way the pulley 21 is rotated relative to the shaft 32, one of the pawls will provide a lock between the parts thus effecting a torque-transfer connection between itself and its associated clutch plate. As the clutch block is further moved, for example upwardly to its extreme limit of travel as shown in Figure 7, the lower pawl will reach its limit of extension as regulated by the collar 68 and will be withdraw completely from its associated recess 71 while the upper pawl will be pressed more firmly into its associated recess by virtue of compression of the spring 64. Thus, as the pulley 21 is rotated in a clockwise direction, as viewed from the top of the mechanism, the engaged upper pawl will transmit driving torque to the clutch block and shaft 32 also in a clockwise direction. Upon reversal of the motor 16, with the clutch mechanism in the aforesaid condition, the upper pawl will, of course, be free to pass out of the open end of the recess 71 and will click into and out of the latter as the pulley rotates to impart no counter-clockwise rotation to the clutch block or shaft. However, as soon as the pulley is again reversed in rotation, the previously clicking pawl will engage its abutment 74 and thereby reestablish torque-transmitting relationship between the pulley and the shaft 32 to again drive the latter in a clockwise direction of rotation. If vertical movement of the clutch block is effected to the other extreme, as shown in Figure 6, counter-clockwise drive of the shaft 32 may be effected with clicking release of the clutch should the drive motor be reversed to clockwise rotation. Thus, depending upon the direction of motor rotation, the shaft 32 may be selectively rotated in either direction under power while permitting instant disconnection of the shaft should the motor be suddenly reversed. It will be noted that at no time is there a position of the clutch block wherein both clutch plates are simultaneously free of driving engagement with the pawls. Means is provided for effecting shifting of the clutch block so as to release the driving connection between the latter and the pulley 21 and to bring the parts into relationship to permit reversals of the shaft 32. Extending upwardly through an axial bore 76 in the shaft 32 is a control rod 77 axially slidable in the latter bore and provided adjacent its upper end with a diametrically enlarged head 78 carrying a transaxially disposed pin 79 which passes through opposed vertically elongated apertures 81, formed in the shaft 32, and engages in apertures 82 provided in the clutch block 57 as shown in Figure 5. The pin 79 may be press-fitted or otherwise secured in the head 78 or in the apertures 82 of the clutch block in order to firmly secure it in place against axial displacement relative to the control rod. The upper extremity of the control rod is extended as a stud 83 into a counterbore 84 formed coaxially with and in the upper end of the shaft 32 and a plug 86 is provided threadedly engaged in and closing the upper end of the counterbore to create a closed chamber. Within the chamber thus formed is provided an outer coil spring 87 bearing at its upper end against the plug 86 and at its lower end against a washer 88 lying against the shoulders provided, respectively, by the bottom of the counterbore 84 and by the junction between the head 78 and the stud 83 of the control rod. An inner coil spring 89 is also provided bearing at its lower end against the washer 88 and at its upper end against a retaining washer 91 suitably secured to the upper end of the stud 83. It will be thus seen that when the control rod 77 is moved in either direction axially, the clutch block 57 will be correspondingly moved due to the connection therebetween formed by the pin 79, the latter being freely movable vertically in the elongated apertures 81. Thus the respective clutches may be selectively disengaged or reengaged as desired by proper movement of the control rod. When the control rod is moved upwardly, the washer 88 will also be correspondingly moved thus compressing the outer spring 87 and establishing a reactance force which will, when the upward pressure on the control rod is released, forcibly return the clutch block to its mid position shown in Figure 4. When the control rod is moved downwardly, the spring 89 will be compressed which, when the control rod is released, will also return the clutch block to its mid position as shown.

Referring to Figure 2, the gear 28 is secured by keys 92 to an axially vertical spindle shaft 93 which is journaled in bearings 94, mounted in the cover plate 26 and in the housing bottom wall 36 respectively, and which is provided with a downwardly projecting integral extension 96 having splines 97 thereon slidably engaged in mating splines 98 of a recess 99 provided in the upper end and extending longitudinally of a spindle 101 arranged coaxially with the spindle shaft 93 and its extension 96. The splines 97 and 98 provide a driving connection between the extension 96 and the spindle 101 but permit relative sliding movement to occur between the elements. Directly below the upper portion of the spindle enclosing the splined recess 99, I provide an integral coaxial stem 102 which is downwardly extended to form a cylindrical chuck body 103 having therein a downwardly opening coaxial recess 104. The chuck body 103 is journaled and axially slidable in a bushing 106 carried by an annular plug member 107 secured in the lower end of a sleeve 108 arranged concentrically with the spindle and whose upper end portion is pressed on or otherwise suitably engaged on a tubular neck 109 formed integrally with and projecting downwardly from the bottom of the housing 22. Within the recess 104 of the chuck body 103 is provided a tool carrier which may take one of several different and suitable forms depending on the character of work to be performed but which, for the purposes of this disclosure, I have chosen to illustrate as a thread-cutting tool in the order of the tap 111 illustrated in Figure 1. In holding such a tool I provide a collet sleeve 112, disposed within and slidable axially of the chuck recess 104, having a downwardly-opening conically-shaped bore 113 disposed concentrically thereof which is adapted to receive the correspondingly-shaped conical jaw portion 114 of a spring collet provided, in its exposed end with a tool-receiving socket 116 which, in the present instance, may be a recess of rectangular cross-sectional form to correspond with the squared end portion of the tap stem. The upper portion of the collet is formed as an integral cylindrical shank 117 extending slidably into a correspondingly cylindrical upward extension of the bore 113 and provided with a concentric threaded bore 118 receiving a screw 119 passing upwardly through a suitable aperture 121 provided in the collet sleeve 112 and having a head 122 formed for the reception of a wrench-like tool by means of which the screw 119 may be rotated to draw the collet upwardly into the bore 113 and thereby radially tighten the collet jaws about the tool stem in the socket 116. Means holding the chuck body 103, the collet sleeve 112 and the collet against relative rotational movement, while permitting relative axial movement to occur therebetween, is provided in a key 123 extending radially through the side wall of the sleeve 112 and secured in place by means of a chordally-disposed pin 124 secured in the sleeve and laterally piercing the key. The outer vertical side portion of the key slidably engages in a keyway 126 provided in the wall of the recess 104 and extending vertically upwardly from the open end of the recess while the inner vertical side portion of the key slidably engages in a keyway 127 provided in and extending axially of the collet shank 117. It will be thus seen that the collet sleeve, the collet and the tool carried thereby may be inserted into or removed from the chuck body as an integral unit thus providing for rapid substitution of the tools so that production operations are not unduly retarded. Means is further provided for adjustably positioning the tool unit embraced by the collet sleeve so that regulation of the vertical depth to which the tool may operate may be secured. Overlying and arranged concentrically with the lower end of the chuck body 103 is a diametrically split ring 128 whose duplicate sections are releasably secured together by screws 129 and which is provided in the central bore thereof with screw threads engaged with mating threads 131 formed on the lower end of the collet sleeve 112. An upwardly extended skirt 132 of the ring 129 is provided at its upper end with a radially inwardly projecting peripheral rim 133 slidably engaged in a mating peripheral groove 134 formed at the lower end of the chuck body so that the ring is thus secured against displacement relative to and axially of the chuck body. The relative proportions of the parts are such that by slightly loosening the screws 129, the ring 128 may be freely rotated on the chuck body thus moving the collet sleeve, due to the action of the threads 131 and those of the ring, upwardly or downwardly as desired relative to the chuck body. Upon the attainment of a desired degree of axial adjustment, the screws 129 may be tightened so as to bind the ring to the chuck body against further movement thus preserving the prescribed relative settings of the parts. A governed, uniform advancement of the cutting tool is effected by providing, on the stem 102, a sleeve 136 having screw threads 137 on its periphery which engage corresponding threads provided in the central bore of a cap 138 secured by screws 139 to the lower end of the housing neck 109. A pin 141 extending transaxially through the stem 102 and the sleeve 136 secures these parts together to be rotated in unison. The pitch of the thread 137 depends upon the particular operation to be performed by the tool since, when the spindle is rotated, the threaded sleeve 136 will regulate the rate of advance or retraction that the tool is allowed to make with respect to the object being operated upon. When the tool is used for machining operations such as drilling, boring, spot-facing or the like, the pitch of the thread may be comparatively fine so as to provide an easy and steady advance of the cutting elements. However, when the tool is a tap or a die it is of course necessary that the pitch of the thread 137 be equal to that of the thread-cutting tool. The use of the feed thread 137 in connection with threading tools has the particular advantage of taking from the latter the strain of feeding themselves through the work, the creation of harmful side wear on the cutting teeth and the possible production of cut threads which do not possess accurate form or pitch characteristics.

Means are provided for regulating the operative cycle of the spindle, that is, the distance that the latter is permitted to ascend and descend in performing an operation, and these means are coordinated with the drive pulley clutching means and the drive motor so that proper reversals of rotation of the tool may be had at the proper times during the operating cycle. The operating rod 77 is extended downwardly into the chamber of the housing 22 and is attached to the upper bell-shaped section 142 of a swivel coupling having a cap section 143 threadedly engaged with the bell section and enclosing a bearing 144 in which is secured, by a nut 146 or otherwise, a downwardly extending shifter rod 147 having an integral extension 148 thereof slidably engaged in a bushing 149 secured in the housing 22 by screws 151 or by other suitable and equivalent means. An intermediate portion of the rod 147 is provided with a screw thread 150 engaged by the threaded bores of collars 152 which may be adjusted as to relative spacing by rotation on the rod and which may be secured in adjusted position by tightening the set screws 153 to bind the collars to the rod. Extending transaxially of the rod 147 and between the confronting faces of the collars 152 is a shift lever 154 having at one end thereof an eye 156, which is journaled on a stud 157 so as to pivotally mount the lever, and which is provided with an integral upwardly-extending arm 158. Lugs 159 formed intermediate the ends of the lever are positioned to be engaged by the collars 152 during vertical movements of the shifter rod 147 and the free or distal end of the lever is provided with a stud 161 on which is carried a bearing member or roller 162 which is positioned to be engaged by collars 163 carried by the spindle 101 when the latter is moved through its operative cycle. The collars 163 are adjustable as to relative vertical spacing and each collar is radially split and fitted with a chordally arranged screw 164 by means of which the collar may be securely clamped in adjusted position on the spindle. The arrangement of the parts is such that in certain portions of the vertical travel of the spindle 101, the collars 163 will engage the roller 162 and will swing the lever 154 upwardly or downwardly as the case may be so as to cause the lugs 159 to engage the collars 152 and correspondingly move the control rod 77 to effect operation of the pulley clutch as previously described.

Also controlled by movements of the lever 154 is mechanism for controlling the operation of the drive motor 16 which comprises upper and lower support blocks 166 and 167 respectively disposed on opposite sides of and spaced from the lever 154 and secured to the vertical side wall of the housing 22 by screws 168 or other suitable mounting means. Each block 166 and 167 is provided with an axially vertical counterbore 169 in which is slidably disposed a plunger 171 bearing against a side of the lever and having a stem portion 172 extending longitudinally of the counterbore and through a guide bore 173 to pass exteriorly of the block where it is provided with a stop washer 174 held in place by means of a pin 176 or any other equivalent device. A coil spring 177 disposed in the counterbore 169 and bearing respectively against the bottom thereof and the head 171 urges the plunger against the side of the lever 154. The function of the opposed spring-pressed plungers 171 is to yieldably maintain the lever 154 in a substantially horizontal neutral position midway between its opposite operating limits of movement. Also slidably mounted in a guide bore 178 provided in the upper support block 166, is a switch plunger comprising a tubular body 179 having at its lower end an axially slidable plug member 181 and at its upper end a threaded socket for the reception of a screw 182 which may be adjusted as to position axially of the body 179 and secured by means of a locknut 183. A coil spring 184, within the bore of the tubular body 179, bears at its opposite ends against the screw 182 and the plunger 181 so as to extend the latter relative to the switch plunger. A pin carried by the plunger, passing transaxially through the latter and operative in an axially elongated aperture formed in the plug member limits the degree of extension of the latter relative to the plunger body 179 but permits a certain amount of upward movement of the plug member independent of the body. Normally, the lower end of the plunger rests against the upper side of the lever 154 so that when the latter is moved, corresponding movement of the plunger in its guide will occur. Aligned with and to be engaged by the upper end of the plunger as the latter is moved upwardly is the spring-resisted control button 186 of a limit switch 187 associated with the control circuits of the motor 16 in such a way that when the contacts of the switch 187 are opened, due to upward pressure of the control button resulting from the spindle 101 reaching the prescribed upper limit of its travel, the motor 16 will be stopped and the circuits thereof, in a manner well known in the electrical art, will be conditioned to institute reversal of the motor drive shaft. An identical limit switch 188 is provided, being mounted by screws 189 to the upper support block 166 alongside of the switch 187, which has a downwardly extending spring-resisted control button 191 positioned to be engaged by a contact screw 192 adjustably mounted at the end of a rocker arm 193 carried by a hub 194 which is journaled on an axially horizontal stud 196, supported by and extending from the vertical side wall of the housing 22, and which is provided with a short radially extending cam lug 197 and with a comparatively longer arm 198 circumferentially spaced from the cam lug. The upper end of the arm 158 extends into the space 199 between the cam lug 197 and the arm 198 and is provided with an inclined cam face 201 confronting and engageable with the cam lug 197. The arrangement of the parts is such that, as is best illustrated in Figure 3, when the lever 154 is forced downwardly by engagement with the upper collar 163 as the spindle 101 reaches the lower prescribed limit of travel, the cam face 201 at the end of the forwardly moving arm 158 will press against the side of the cam lug 197 thus swinging the rocker arm 193 upwardly to depress the control button 191 of the limit switch 188, stop the motor 16 and subsequently condition the circuits for rotational reversal of the motor drive shaft. A screw 202, threadedly engaged in the end of the arm 158 and held in adjusted position by means of a locknut 203, is adapted to bear against the arm 198 during recovery movement of the arm 158 so as to positively carry the contact screw 192 out of engagement with the control button 191 and thus preclude holding the contacts of the switch 188 in open condition which might occur if the rocker arm 193 were to stick in elevated position. It will be understood, of course, that the various adjustments provided in the selective positionings of the spindle collars 163, the control rod collars 152 and the contact screws can be coordinated to produce simultaneous operation of the clutch control mechanism and the motor control switches so that very accurate stoppage of the vertical movements of the spindle can be had. Since the drive pulley clutch releases simultaneously with the operation of the switches any free overrun of the motor will not affect movement of the spindle beyond its fixed limits of travel. It is thus possible to accomplish boring operations completely to the bottom of a recess or to use bottoming taps or run thread-cutting dies completely up to a shouldered limit without danger of jamming or otherwise damaging the tools.

In operation, the collars 163 are spaced apart axially of the spindle 101 and are fixed in position to set the limits of the vertical travel of the tool 111 toward and from the work, the collars 152 being similarly set so as to actuate the clutch at the respective limits. Also adjusted are the screws 192 and 202 which control the switches governing reversals of the drive motor 16. Figure 2 shows the mechanism with the spindle at the upper limit of its travel ready to start its downward movement in response to advancement of the cutting tool 111 by the feed screw 137. As power is applied to the spindle by the motor 16 the spindle will rotate thereby threading the feed screw 137 through the collar 138 and causing the lower collar 163 to descend away from the shift lever roller 162 and permitting the shift lever to assume its neutral position. As the spindle continues to rotate under power, the upper collar 163 will approach the roller 162 until the latter is engaged thereby causing the shift lever to swing downwardly so as to draw the rod 77 downwardly until the clutch releases and at the same time swinging the lever 183 upwardly to cause actuation of the switch 191 to reverse the motor. Disengagement of the clutch and reversal of the motor both are set to take place simultaneously so that the cutting tool is immediately started on its upward travel when the spindle reverses its rotation. Continued upward travel of the spindle will eventually cause the lower collar 163 to engage the shift lever roller 154 whereupon, at a point sufficient to permit the tool to clear the work, the clutch will be again disengaged and the motor again reversed to permit driving of the spindle downwardly in its movement to feed the cutter 111 into the succeeding work piece which has been brought into alignment with and below the cutter. This cycling of the axial and rotational movements of the spindle will thereafter automatically repeat themselves as long as the positions of adjustment of the collars 163, the collars 152 and the switch screws 192 and 202 are not disturbed. It will be noted that at the moment the clutch is released, the motor becomes disconnected from the spindle in relation to one direction of rotation of the latter but still retains a driving connection with the spindle in the other direction of rotation of the latter. Thus no brakes or other arresting means are required in connection with the motor to protect the spindle and tool against running beyond their prescribed limits of travel.

The apparatus of my invention above described is particularly useful in production operations wherein, when once adjusted and conditioned for functioning, it may be run for extended periods without attention and will accurately perform the prescribed production operations assigned to it and will produce parts which, in the machined portions thereof, are substantial duplicates of each other.

I claim:

1. Apparatus of the character described comprising a housing having an axially vertical rotatable spindle journaled therein and arranged to be moved axially between limits of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being adjustable as to position relative to the spindle and as to relative spacing so as to correspondingly vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a motor connected with said housing and having a reversible drive shaft, power transmission means operatively connecting said motor shaft and spindle for rotating the spindle in reverse directions in response to reversals of said motor shaft, said power transmission means including clutch mechanism operative in one position of said spindle in its cycle to disconnect the spindle from the motor in one direction of rotation of the latter while maintaining a driving connection between the spindle and motor in the other direction of rotation of the latter, and said clutch mechanism being operative in another position of said spindle in its cycle to disconnect the spindle from the motor in said other direction of rotation of the latter while maintaining a driving connection between the motor and spindle in said one direction of rotation of the latter, actuating means including a lever disposed between and engageable by said collars during movement of the spindle between the limits of its operational cycle, and control means connected with and for effecting reversals of said motor engaged with and controlled by and upon movement of said lever.

2. Apparatus of the character described comprising a housing having an axially vertical rotatable spindle journaled therein and arranged to be moved axially between limits of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being axially adjustable relative to the spindle and to each other so as to selectively vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a motor connected with said housing and having a reversible drive shaft, control mechanism connected with said motor and for effecting reversals of rotation of the motor shaft, power transmission means connecting said motor shaft and spindle for rotating the spindle in reverse directions in response to reversals of said motor, said power transmission means including a driven clutch element connected to and rotatable with said spindle and said power transmission means further including driving clutch elements connected to and rotatable with said motor shaft in directions corresponding to reversals of the latter shaft, said driven clutch elements having grip members thereon which in power transmission condition of the clutch mechanism are in constant engagement with the driving clutch elements to provide driving connection therebetween in both directions of rotation of the motor shaft, a control member for shifting said driven clutch element in opposite directions toward the respective driving clutch elements to release driving engagement with both of the latter in one direction of rotation of the driven clutch element but maintaining driving engagement with one of the driving clutch elements in the opposite direction of rotation of the driven clutch element, said control member for shifting the driven clutch element being engageable with and operative by said collars and upon movement thereof between the limits of said operational cycle of the spindle, and an element engaged with said motor control mechanism operable by and upon movement of said collars for actuating the motor control mechanism to effect reversals of said motor shaft.

3. Apparatus of the character described comprising a housing having an axially vertical rotatable spindle journaled therein and arranged to be moved axially between liimts of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being axially adjustable relative to the spindle and to each other so as to selectively vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a motor connected with said housing and having a reversible drive shaft, control mechanism including switches connected with said motor and for effecting reversals of rotation of said motor shaft, power transmission means disposed between said motor and spindle for rotating the spindle in reverse directions in response to reversals of said motor, said power transmission means including a driven clutch element connected to and rotatable with said spindle and said power transmission means further including driving clutch elements connected to and rotatable with said motor shaft in directions corresponding to reversals of the latter shaft, said driven clutch elements having grip members thereon which in power transmission condition of the clutch mechanism are in constant engagement with the driving clutch elements to provide driving connection therebetween in both directions of rotation of the motor shaft, means for shifting said driven clutch element in opposite directions toward the respective driving clutch elements to release driving engagement with both of the latter in one direction of rotation of the driven clutch element but maintaining driving engagement with one of the driving clutch elements in the opposite direction of rotation of the driven clutch element, said means for shifting the driven clutch element comprising a control rod connected with and to move said driven clutch element, spaced collars on said control rod, a lever mounted in said housing having a portion thereof interposed between and engageable with the control rod collars and having another portion thereof interposed between and engageable by the collars of said spindle whereby said lever will be moved by and upon movement of the spindle between the limits of the operative cycle thereof and the control rod and its connected driven clutch element will be moved correspondingly, and a member operatively engageable with said switches and with said lever for operating said switches upon movement of said lever.

4. Apparatus of the character described comprising a housing having an axially vertical rotatable spindle journaled therein and arranged to be moved axially between limits of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being axially adjustable relative to the spindle and to each other so as to selectively vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a motor connected with said housing and having a reversible drive shaft, control mechanism including switches connected with said motor and for effecting reversals of rotation of said motor shaft, power transmission means disposed between said motor and spindle for rotating the spindle in reverse directions in response to reversals of said motor, said power transmission means including a driven clutch element connected to and rotatable with said spindle and said power transmission means further including driving clutch elements connected to and rotatable with said motor shaft in directions corresponding to reversals of the latter shaft, said driven clutch elements having grip members thereon which in power transmission condition of the clutch mechanism are in constant engagement with the driving clutch elements to provide driving connection therebetween in both directions of rotation of the motor shaft, means for shifting said driven clutch element in opposite directions toward the respective driving clutch elements to release driving engagement with both of the latter in one direction of rotation of the driven clutch element but maintaining driving engagement with one of the driving clutch elements in the opposite direction of rotation of the driven clutch element, said means for shifting the driven clutch element comprising a control rod connected with and to move said driven clutch element, spaced collars adjustably positioned and secured on the control rod, a lever mounted for pivotal movement in said housing having a portion thereof interposed between and engageable with the control rod collars, a roller carried by the distal end of said lever interposed between and engageable by the collars of said spindle whereby the lever will be moved by the spindle during movement of the latter between the limits of its operational cycle so as to move the control rod correspondingly, one of said switches being operable directly by movement of said lever in one direction, and motion-multiplying means interposed between said lever and another of said switches for actuating said last named switch upon movement of the lever in an opposite direction.

5. Apparatus of the character described comprising a housing having an axially vertical rotatable spindle journaled therein and arranged to be moved axially between limits of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being axially adjustable relative to the spindle and as to relative spacing so as to selectively vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a motor connected with said housing and having a reversible drive shaft, control mechanism including switches connected with said motor and for effecting reversals of rotation of said motor shaft, power transmission means disposed between said motor and spindle for rotating the spindle in reverse directions in response to reversals of said motor, said power transmission means including a driven clutch element connected to and rotatable with said spindle and said power transmission means further including driving clutch elements connected to and rotatable with said motor shaft in directions corresponding to reversals of the latter shaft, said driven clutch elements having grip members thereon which in power transmission condition of the clutch mechanism are in constant engagement with the driving clutch elements to provide driving connection therebetween in both directions of rotation of the motor shaft, means for shifting said driven clutch element in opposite directions toward the respective driving clutch elements to release driving engagement with both of the latter in one direction of rotation of the driven clutch element but maintaining driving engagement with one of the driving clutch elements in the opposite direction of rotation of the driven clutch element, said means for shifting the driven clutch element comprising a control rod connected with and to move said driven clutch element, spaced collars adjustably positioned and secured on the control rod, a lever mounted for pivotal movement in said housing having a portion thereof interposed between and engageable with the control rod collars, a roller carried by the distal end of said lever interposed between and engageable by the collars of said spindle whereby the lever will be moved by the spindle during movement of the latter between the limits of its operational cycle so as to move the control rod correspondingly, one of said switches being operable directly by movement of said lever in one direction, and motion-multiplying means interposed between said lever and another switch for actuating said switch upon movement of the lever in an opposite direction, said means comprising a rocker arm mounted for pivotal movement on said housing and operatively engageable with the last-mentioned switch, said rocker arm having a radial cam lug extending therefrom, and an arm carried by said lever extending toward and having a cam face engageable with said cam lug upon movement of the lever for rapidly moving said rocker arm.

6. Apparatus of the character described comprising a housing having an axially vertical rotatable spindle journaled therein and arranged to be moved axially between limits of an operational cycle, a threaded member carried by said housing, a threaded element carried by said spindle and cooperative with said threaded housing member to move the spindle, when the latter is rotated, between said limits of its operational cycle, spaced collars on said spindle defining the said limits of the operational cycle, said collars being axially adjustable relative to the spindle and as to relative spacing so as to selectively vary the limits of the operational cycle, a tool holder on said spindle carrying a tool to be moved correspondingly with the movements of said spindle, said tool holder being adjustably movable to selected positions axially of said spindle so as to vary the position of said tool relative to the limits of said operational cycle of the spindle, a reversible motor, power transmission means disposed between said motor and spindle for rotating the spindle in reverse directions in response to reversals of said motor, said power transmission means including coaxial relatively spaced driving clutch elements connected to and rotatable with said motor, said driving clutch elements having clutch pawl recesses in confronting faces thereof, a driven clutch element between said driving clutch elements and connected to and rotatable with said spindle, said driven clutch member having therein spring-pressed pawls which in power transmission condition of the clutch mechanism are in constant engagement with the pawl recesses of the driving clutch elements to provide driving connection therebetween in both directions of rotation of the motor, a control rod connected with and for shifting said driven clutch element in opposite directions toward the respective driving clutch elements to release driving engagement with both of the latter in one direction of rotation of the driven clutch element but maintaining driving engagement with one of the driving clutch elements in the opposite direction of rotation of the driven clutch element, spaced collars on said control rod, a lever mounted in said housing having a portion thereof interposed between and engageable with the control rod collars and having another portion thereof interposed between and engageable by the collars of the spindle whereby said lever will be moved by and upon movement of the spindle between the limits of the operative cycle thereof and the control rod and its connected driving clutch element will be moved correspondingly, switches carried by the housing and included in electrical circuits for stopping and reversing said motor, and means operative by and upon movement of the lever for operating said switches.

7. In apparatus of the character described having a reciprocable rotary spindle carrying a tool to be moved between limits of an operative cycle and provided with a reversible drive motor connected with and to drive said spindle through power transmission means, axially adjustable spaced collars on said spindle defining the limits of said operative cycle, a clutch in said power transmission means comprising spaced, coaxial and unitarily rotatable clutch elements connected to be driven in opposite directions by said motor, each of said motor driven clutch elements having in confronting faces thereof clutch pawl recesses having bottom surfaces angularly included with respect to the confronting faces of the clutch elements and terminating in abutments normal to said faces, a spindle clutch element between said motor driven clutch elements and connected to rotate with said spindle, said motor driven clutch elements having therein spring-pressed pawls which in power transmission condition of the clutch mechanism are in constant engagement with the pawl recesses and abutments of the motor driven clutch elements to provide driving connection therebetween in both directions of rotation of the motor, a control rod connected with and for shifting said spindle clutch element in opposite directions toward the respective motor driven clutch elements to release driving engagement with both of the latter in one direction of rotation of the driving clutch element but maintaining driving engagement with one of the motor driven clutch elements in the opposite direction of rotation of the spindle clutch element, a lever associated and movable with said control rod engageable by portions of said spindle collars during movement of the latter between limits of its operational cycle for moving said rod to correspondingly move said spindle clutch member, switches operatively included in electrical circuits for stopping and reversing said motor, and means operative by and upon movement of the lever for operating said switches.

WILLIAM FUNK.

REFERENCES CITED

The following references are of record in the file of this patent:

UNITED STATES PATENTS

| Number | Name | Date |
|---|---|---|
| 1,213,354 | Grindall | Jan. 23, 1917 |
| 1,237,025 | Davison | Aug. 14, 1917 |
| 2,011,000 | Kingsbury | Aug. 13, 1935 |
| 2,098,675 | Procunier | Nov. 9, 1937 |
| 2,167,401 | Foster et al. | July 25, 1939 |
| 2,312,115 | Mitchell | Feb. 23, 1943 |
| 2,323,488 | Schauer | July 6, 1943 |
| 2,405,718 | Schafer | Aug. 13, 1946 |